United States Patent

[11] 3,615,170

[72] Inventors Wayne C. Hazen
 Wheat Ridge;
 Pablo Hadzeriga, Arvada; Paul R. Kruesi, Golden, all of Colo.
[21] Appl. No. 881,654
[22] Filed Dec. 3, 1969
[45] Patented Oct. 26, 1971
[73] Assignee Molybdenum Corporation of America
 New York, N.Y.

[54] PROCESS FOR SEPARATING METALS USING DOUBLE SOLVENT EXTRACTION WITH BRIDGING SOLVENT MEDIUM
 14 Claims, 5 Drawing Figs.
[52] U.S. Cl. ..................................................... 23/22,
 23/23, 23/24, 23/312,
[51] Int. Cl. ..................................................... C22b 59/00
[50] Field of Search ........................................ 23/15–20,
 22–24, 310–312 ME

[56] References Cited
 UNITED STATES PATENTS
3,110,556  11/1963  Peppard et al. ............... 23/23
3,167,402  1/1965   Samuelson et al. ........... 23/312 ME
3,193,381  7/1965   George et al. ................. 23/20 UX
3,259,472  7/1966   Rice ............................. 23/22 X
3,302,993  2/1967   Bray ............................. 23/23
3,387,944  6/1968   Sheerington et al. ......... 23/312 ME

OTHER REFERENCES

Elgin et al. " Chemical Engineers Handbook," Sec. 2, 1950, pp. 713– 718.

Jamrack, " Rare Metal Extraction by Chemical Engineering Techniques," Vol. 2, MacMillan Co., N.Y. 1963, pp. 181– 184.

Primary Examiner—Herbert T. Carter
Attorney—Morgan, Finnegan, Durham and Pine

ABSTRACT: Solutions of metal values are fractionated by a double solvent liquid-liquid extraction process wherein the solution is contacted with one extractant to selectively remove at least one metal value, then the solution is contacted with a second extractant to selectively remove another metal value, and the solution depleted of both metal values is recycled in a bridge between the two extractants. The process permits separation in aqueous and nonaqueous media; and it improves separation efficiency by allowing equilibration of metal values between the unmixed extractants and by permitting countercurrent flows. The process is especially useful to fractionate rare earth metal values and yttrium.

PROCESS FOR SEPARATING METALS USING DOUBLE SOLVENT EXTRACTION WITH BRIDGING SOLVENT MEDIUM

This invention relates to the purification, separation and recovery of metal values from solutions. In particular, it concerns improved liquid-liquid solvent extraction methods which provide unexpectedly more efficient fractionation of difficult to separate metals than do prior art processes.

BACKGROUND OF THE INVENTION

The metals primarily contemplated to be separated by this invention reside fairly closely and often adjacently to one another in the Periodic System. Such difficulty separable elements include, for example, those of the lanthanide series, and yttrium. Such metals and their salts, i.e., generically, metal values, are often together in solution, for example, in aqueous solutions, such as leach liquors resulting from the processing of ores and commercial residues, or in organic solutions, such as those obtained by commercial solvent extraction operations. It is conventional in various mineral and metallurgical processes to seek to separate and recover one desired metal value free from the other metals in the initial aqueous or organic solution. The pure rare earth elements and their salts are valuable, some of them having neutron moderating properties, and the salts of the various rare earths are suitable as pigments, for example, because of their different colors. Yttrium, a metal which can be separated by the present process is valuable also, for example, as a "getter" in vacuum tubes and in the production of yttrium hydride, a neutron moderator.

Closely related elements of the above-mentioned type have been separated in the past by tedious fractional precipitation methods. More recently, particularly for the separation of elements in the lanthanide and actinide series and yttrium, introduction of ion exchange processes marked a notable advance in separation procedures. Still more recently there have become available liquid-liquid extraction procedures for the separation of mixtures of closely related metals and these are of special importance in the separation of rare earth mixtures. Such procedures are based upon the selective extraction of metal values from the solution in which they are contained into a solvent-extractant which is immiscible with the solution.

Merely by way of illustration, when rare earths are to be separated by such techniques, the selective solvent extractant employed extracts the rare earth values and it would generally comprise, if the metal values are in aqueous solution, such as acidic leach liquors, at least several percent by weight of an extractant such as a suitable amine or alkyl phosphate dissolved in a water-immiscible solvent, kerosene generally being used for economic reasons. If the metal values, on the other hand, are present in an organic solvent, then the separation is called a back extraction, stripping or scrubbing operation, because the separation from the organic solvent is made into an aqueous, acidic solution, but in some cases basic or neutral solutions are used. With respect to solvent extraction, as has been mentioned, means are now available to achieve a separation within the rare earth series. For example, if the rare earths are in aqueous solution, liquid-liquid extraction with an immiscible solvent comprising an amine, will extract the lighter rare earth elements generally beginning with lanthanum and proceeding through samarium according to atomic number. The heavier elements, beginning generally with europium and ending with lutetium and including yttrium will not be extracted with the amine system. Then if the same aqueous feed, but depleted in lighter metal values, is subjected to further liquid-liquid extraction with a phosphate ester extractant in an immiscible solvent there occurs more separation by a selective extraction of the heavier rare earth elements according to atomic number, beginning generally with europium and ending with lutetium and including yttrium. These techniques are employed in the prior art using one solvent system, in the most efficient of which the organic extractants flow countercurrently to the aqueous feed solution. In all single stage systems the values to be extracted and/or separated are split into two streams, a depleted aqueous medium, which is designated the raffinate, and an extract.

A substantial advance in the art of separating metal values is provided by use of a two-solvent liquid-liquid extraction system to separate the rare earth elements, and this is described in copending U.S. Pat. application Ser. No. 657,580, filed Aug. 1, 1967 and now abandoned. In that system two solvents flow countercurrently to an aqueous solution and the values to be separated or extracted from the aqueous feed solution are split into three streams, two extracts and one raffinate. It is found in such a system that by proper selection of the organic solvents and the conditions for the extraction, the desired separation of the values contained in the aqueous feed solution can be obtained. The primary advantage of the system described in the copending application is that it provides substantially improved separations with a greatly reduced number of stages than would be required using the same solvent singly. Although such a double solvent extraction system of the type described in the copending application is very efficient for the separation of difficult to separate metal values, especially the rare earths, it is a requirement of the system that both organic solvents flow cocurrently against the aqueous solution. Because of the cocurrent or countercurrent flow of the solvents with one solvent flowing cocurrently with the aqueous, in the copending application, maximum efficiency cannot be increased. Thus, there would be a substantial improvement in separation if a double solvent extraction system could be provided which would separate metal values in organic as well as aqueous media; which permits transfer of values between the solvents until equilibrium is established; and in which the flows can be countercurrent. Such an improved double solvent extraction process is provided by this invention. It has now been found that if a double extraction system is used, in which the extractants are allowed to reach equilibrium among themselves using a bridging solvent between the two, extraction and separation of dissolved metal values using two extractants can be carried out in a more efficient manner than heretofore.

It is a primary object of this invention therefore to provide an improved double liquid-liquid extraction process to separate difficult to separate metal values.

A further object of the invention is to provide a solvent-solvent extraction and separation process which can operate on metal values in aqueous or nonaqueous solutions.

Still another object of the invention is to provide a process to separate difficult to separate metal values using a double solvent extraction system in which the flows of the two solvents are countercurrent to one another.

A further object of the invention is to provide an improved process to separate the lanthanide rare earths and yttrium, one from the other.

DESCRIPTION OF THE INVENTION

The above valuable objects and additional objects apparent to those skilled in the art from a consideration of the description herein are easily achieved by the practice of the present invention which is in essence:

A process for separating metal values dissolved in a solution containing at least two of said metal values which comprises:
  a. contacting and mixing said solution with a first immiscible extractant solvent medium, which extractant solvent medium exhibits selectivity for at least one of said metal values to produce a first extract comprising the first selectively extractable metal values dissolved in said first immiscible extractant solvent medium and separating said solution depleted in said first metal values from said first extract;
  b. contacting and mixing the solution produced in step (a) with a second immiscible extractant solvent medium, which extractant solvent medium exhibits selectivity for at least one of said metal values to produce a second extract comprising the second selectively extractable metal values dissolved in said second immiscible extractant solvent medium and separating said solution depleted in said first and second metal values from said second extract;

c. continuously recycling said solution from step (b) between the said first and second media; and d. recovering said metal values from said first and second extracts.

This invention also contemplates a number of specific embodiments.

In one such process the solution contains at least two selectively extractable metal values and at least one third metal value which is not selectively extractable either by the first or by the second of said immiscible solvents, and the process includes the step of recovering the third metal values from the solution depleted in said first and second metal values. In this embodiment a particular element which is desired to be extracted, such as one particular rare earth element, may be concentrated in the aqueous solution of a water (or solvent) bridge, i.e., the solution of step (c) above. If this is the case, this process may be carried out in such a manner as to continuously withdraw the particular phase from the selected bridge and to replace the withdrawn volume with enough makeup solution to maintain a constant phase relationship. The desired metal is recovered then from the withdrawn phase.

Another preferred process includes additional stages for further enhancing the separation of the first and second metal values. If the extractant in step (a) is designated A and the extractant used in step (b) is designated B, then this preferred process comprises:

I. contacting and mixing extract A with a bridging solvent medium immiscible with both A and B extractant media to become in equilibrium with the metal values of the bridging solvent medium; separating the bridging solvent medium; contacting and mixing the bridging solvent medium with fresh extractant B to produce an extract of the metal values; continuously recycling the bridging solvent between extractants A and B; obtaining a final extract A; and using extract B in step (b) of the central stage; and II. contacting the mixing extract B with a bridging solvent medium immiscible with both A and B extractant media to become in equilibrium with the metal values of the bridging solvent medium; separating the bridging solvent medium; contacting and mixing the bridging solvent medium with fresh extractant A to produce an extract of the metal values; continuously recycling the bridging solvent between extractants A and B; obtaining a final extract B; and using extract A in step (a) of the central stage. This embodiment provides substantially enhanced separation efficiency as compared to the broad process first-above defined. In such an embodiment, in each stage, consisting of a pair of mixer settlers, for example, the bridging solvent medium circulates between the two extractants serving as a novel means to transfer the extractable, difficult to separate metal values causing them to move from one extractant to the other. If the bridging solution is an aqueous solution, it may be adjusted in composition of in pH to perform which ever separation is most efficient.

An especially preferred process is a continuous countercurrent multistage process using in each subsequent stage the respective extracts containing the metal values as the extractants, pairing them through a bridging solvent medium with extractants to produce subsequent extracts of the metal values; continuously recycling each bridging solvent between the extracts, and using the extracts as extractants in the preceding respective stages. There is no substantial upper limitation on the number of stages which can be employed in this embodiment, for example, three, five and seven stages, and even more can be used, the higher number of stages being beneficial when the separation of very difficulty separable metal values is to be accomplished with the greatest efficiency.

A preferred process will be one wherein the solution is an aqueous solution; and wherein the first and second immiscible solvent media are organic solvent media. This defines a "water bridge" embodiment.

Another preferred process according to this invention will be one wherein the solution is an organic solvent solution and wherein the first and second immiscible solvent media are aqueous media. This defines a nonaqueous "solvent bridge" embodiment.

It is to be understood that the present process broadly is applicable to extractions from aqueous solutions into organic solvents, and to extraction from nonaqueous solutions into aqueous solutions. In the water bridge embodiment, the extraction is made from aqueous solutions, for example, in the case of rare earth and yttrium values from aqueous acid solutions according to manipulations and in equipment such as described in U.S. Pat. Nos. 2,955,913 and 3,110,556. Such extractions with a first and second immiscible organic solvent are described in the said copending application Ser. No. 657,580, now abandoned, filed Aug. 1, 1967.

The solvent bridge embodiment is versatile. As in the water bridge embodiment, it can be used for separation of metal values. This will be better understood by reference to FIG. 5 in the drawings. The system illustrated comprises three stages, each consisting of two mixers and two settlers, with the nonaqueous phase circulating between. The values to be separated are present in the organic phase fed in the central stage. This organic phase enters in contact with two aqueous solutions, each having a different composition thereby extracting from the organic feed different values. Aqueous solution A moves to the right solvent bridge and aqueous solution B moves to the left solvent bridge in the flowsheet in a countercurrent fashion. It will be understood that in the two side solvent bridges, both solvents are not necessarily the same. And neither is necessarily the same as the solvent fed into the central solvent bridge. Thus, in its broadcast aspects, there can be three or two different solvents or one solvent doing the three stage solvent bridge system, which permits wide latitude in selection for separation and purification purposes.

In addition, the values to be separated in either the solvent bridge or water bridge systems do not necessarily have to be present in the organic (or aqueous) feed in the central stage. Referring again to FIG. 5, the system illustrated may be used to purify aqueous solution A whereby the impurities (or metal values) in A can be efficiently transferred to aqueous solution B by use of the solvent bridge. In conventional solvent extraction processes, if purification or separation has to be made of values present in aqueous solution A, this solution is countercurrently contacted with one solvent, then the solvent is stripped whereby the impurities or values are transferred to another aqueous (for instance aqueous solution B). In the solvent bridge system of the present invention this can be accomplished more efficiently using appropriate solvents and directly produced aqueous solution B.

It is also obvious that the aqueous bridge embodiment provides the same versatility. It is seen from the drawings, FIG. 4, that it is not essential for the aqueous feed to contain the values to be separated. Instead, they may be present either in "barren" organic A or B and the values (or impurities) may be transferred from one organic to another, entirely analogously with the solvent bridge process.

A feature of this invention, therefore is a multistage process wherein the metal values are fed into the system dissolved in the aqueous or nonaqueous extractant media used in the last phase of the process. This system can separate metal values and impurities introduced centrally and terminally.

Another feature of this invention is a multistage process wherein the metal values or impurities are not fed into the first stage. This system permits transfer of values or impurities between terminal stages. The solvent bridge embodiment is applicable in conventional stripping and scrubbing operations in which organic extracts containing the metal values are treated with immiscible aqueous solutions, such as aqueous mineral acid solutions, e.g. sulfuric, nitric or hydrochloric acids, to recover the metal values from the organic extracts. Such processes are described in U.S. Pat. Nos. 3,077,378 in 3,167,402. Illustrative of the aqueous solutions contemplated for use as feeds in the water bridge embodiment are aqueous solutions of a plurality of rare earth salts and of yttrium, of copper and iron, of nickel and cobalt. These solutions are obtained by leaching ores, preparing commercial residues for recovery operations, back extracting organic solvents pregnant with mixed metal values, and so forth. The organic solvent solutions employed as feeds in the solvent bridge embodiments can be obtained by contacting leach liquors from ore processing operations, or liquors from processing of scrap metals, other types of waste liquors, byproduct streams such as those produced in phosphate processing and so forth.

Another process of this invention is one in which the metal values are selected from the group consisting of rare earth and yttrium values. Although the present process broadly is applicable to the separation of all difficulty separable, extractable metal values, it is of very substantial importance in separating the rare earths and yttrium.

The invention also provides a process in which the feed is an aqueous solution of praseodymium and neodymium values, the first immiscible extractant solvent medium comprises a phosphate ester, e.g. diethylhexylphosphoric acid, in a solvent-diluent, e.g., a hydrocarbon solvent fraction, such as kerosene; the second immiscible extractant solvent medium comprises an amine, e.g., an aliphatic quaternary amine, in a solvent-diluent, e.g., kerosene; the first selectively extractable metal value is neodymium and the second selectively extractable metal value is praseodymium.

Another process of this invention is one in which the feed is an aqueous solution containing the lanthanide series of rare earths, i.e., lanthanum, cerium, praseodymium, neodymium, samarium, europium, gadolinium, terbium, dysprosium, holmium, erbium, thulium, ytterbium and lutetium and yttrium, the first immiscible extractant solvent comprises a phosphate ester, e.g., diethylhexyl phosphoric acid in a solvent-diluent, e.g., kerosene; the second immiscible extractant solvent comprises an amine, e.g., a mixture of alkyl primary amine isomers having 18–20 carbon atoms, in a solvent-diluent, e.g., kerosene; the first selectively extractable metal values are the "heavy" rare earths of atom number from about 63 to the 71, i.e., europium, gadolinium, terbium, dysprosium, holmium, erbium, thulium, ytterbium and lutetium, and yttrium, atomic number 39; and the second selectively extractable metal values are the "light" rare earths of atomic number of from 58 to about 62, i.e., lanthanum, cerium, praseodymium, neodymium, and samarium.

A preferred process according to this invention is a three-stage continuous countercurrent process in which the feed is an aqueous solution containing about 100 grams/liter of rare earth values which solution is 4 molar in ammonium nitrate, the metals comprising the lanthanide series, i.e., lanthanum, cerium, praseodymium, neodymium, samarium, europium, gadolinium, terbium, dysprosium, holmium, erbium, thulium, ytterbium and lutetium, and yttrium; the first immiscible extractant solvent medium is 50 percent diethylhexyl phosphoric acid in an aromatic hydrocarbon solvent (SacoSol 150); the second immiscible extractant solvent medium is 25 percent quaternary aliphatic amines (tricaprylyl methyl ammonium chloride) in an aromatic hydrocarbon solvent (SacoSol 150); the first selectively extractable metals are the "heavy" rare earths of atomic number of from about 63 to 71, i.e., europium, gadolinium, terbium, dysprosium, holmium, erbium, thulium, ytterbium and lutetium and yttrium, atomic number 39; and said second selectively extractable metals are the "light" rare earths of atomic number of from 58 to about 62, i.e., lanthanum, cerium, praseodymium, neodymium and samarium.

Another process according to the invention is one in which the feed is an aqueous solution which is a lanthanum concentrate containing lanthanum, praseodymium and neodymium which solution is 4 molar in ammonium nitrate; the first immiscible extractant solvent medium is 43 percent diethylhexyl phosphoric acid and 7 percent ammonium diethylhexyl phosphate in an aromatic hydrocarbon (SacoSol 150); the second immiscible extractant solvent medium is 15 percent quaternary aliphatic amines (tricaprylyl methyl ammonium chloride) in an aromatic hydrocarbon (SacoSol 150); the first extractable metal values are praseodymium and neodymium and the second extractable metal value is lanthanum.

Still another preferred feature of this invention is a five-stage process in which the feed is an aqueous lanthanum concentrate comprising lanthanum, praseodymium and neodymium; the first immiscible extractant solvent medium is 30 percent diethylhexyl phosphoric acid in kerosene; the second immiscible extractant solvent medium is 15 percent alkyl primary amines having 18–21 carbon atoms in kerosene; the bridging solvents in stages 1 to 5, respectively, are aqueous mineral acids having pH values of 1.4, 1.5, 5.7, 2.2, and 2.0; the first extractable metal values are praseodymium and neodymium and the second metal value is lanthanum.

As will be shown hereinafter, these latter systems provide substantially enhanced efficiency in the separation of these difficulty separable, extractable metals. Greater separation factors are achieved than can be obtained by prior art methods using either immiscible extractant solvent alone.

When used herein and in the appended claims, the expression "contacting and mixing" contemplates any suitable means of bringing together the immisicible fluid phases. In any case the metal value is separated from the feed material in processing equipment which is conventional in the art. Such systems may be adapted to simple phase equilibrations, e.g., separatory funnels, continuous countercurrent extraction using mixer-settler systems, which are preferred; but other systems amenable to efficient contact and separation of immiscible fluid phases also can be used. Phase ratios in the range of about 1:20 to 20:1, nonaqueous to aqueous, are usually satisfactory, and it will be appreciated that concentrations of the amines and alkyl phosphate, phosphonate or phosphoric acid ester extractant in the organic solvent-diluent, and, in the water or solvent bridge systems, the pH and ionic strength of the aqueous solution, are interrelated and that the particular choice for these variables will depend on a variety of factors including solubilities of relevant materials, losses, recovery and purity level desired, and the like. In the present invention, of course, the organic solvents should be insoluble in aqueous solutions and they should also have a selectivity for extraction of the metal values. "Organic immiscible extractant solvent" media are contemplated to comprise a solvent-diluent and an extractant, which is an amine or phosphoric acid ester or mixtures thereof of the character to be described hereinafter. Paraffins, such as kerosene, other petroleum fractions, xylene, toluene and the like are excellent solvent-diluents for the preparation of organic extractant phases. Especially preferred are kerosene and an aromatic hydrocarbon mixture sold under the trade name "SacoSol 150". However, many other materials are satisfactory including aliphatic hydrocarbons, halogenated hydrocarbons and the like. Selection is usually made on an economic basis and operational factors. Concentrations of the extractant in the solvent-diluent can range from about 0.05 percent to pure extractant. One class of extractants comprises organic soluble primary, secondary, tertiary and quaternary amines. Illustrative of amines which exhibit selectivity for metal values are trioctylamine, dodecylamine, heptadecylamine, mixed $C_{12}$–$C_{14}$ primary aliphatic amines with highly branched chains (sold by Rohm & Haas Co. under the trade name "Primene 81-R"), mixed $C_{18}$–$C_{21}$ primary alkyl amines having highly branched chains (sold by Rohm & Haas Co. under the trade name "Primene JM-T"), N-benzylheptadecylamine, and the like. Preferred extractants of this class are the above-described branched chain primary amines or N-benzylheptadecylamine diluted with kerosene, or SacoSol 150. Especially preferred because of high extraction efficiency and because it does not become water soluble when dilute sulfuric acid is added, is the product Primene JM–T. Quaternary amines, as have been mentioned, also are of substantial use and are preferred members of this class of extractants. Special mention is made of the product (sold by General Mills, Inc. under the trade name "Aliquat 336") which is described as tricaprylyl methyl ammonium chloride. A preferred concentration level either for Primine JM–T or Aliquat 336 in the solvent diluent would be from about 5 percent to about 50 percent weight, illustrative levels being, for example, 10 percent, 15 percent and 25 percent by weight.

Another important class of extractants comprises substantially water-immiscible alkyl phosphonates or alkyl orthophosphates, wherein the alkyl groups each contain from about four to about 20 carbon atoms in straight or branched chains. Illustrative of these compounds which exhibit selectivity for certain metal values are tributyl phosphate, trioctyl phosphate, dodecyl phosphoric acid, di-n-butyl orthophosphate, di-2-ethylhexylorthophosphoric acid (H-DEHP) and the like. Especially preferred in this class is HDEHP because it has a low solubility in water and a lesser tendency to hydrolyze; it is commercially available. The solvent-diluent used with this class of extractants are generally the same as those to illustrated for the other class above, e.g., toluene, xylene, kerosene, SacoSol 150 and the like. The concentration of the phosphonates or orthophosphates in the diluent can be varied widely, a concentration between 5 percent and 75 percent being the preferred range. Also it is useful sometimes to have present a proportion of an organic-soluble salt of an alkyl phosphoric acid, e.g., ammonium diethylhexyl phosphate to this type of extractant, a preferred composition being, for example, a 50 percent HDEHP in SacoSol 150 which has been treated with ammonia to the desired extent to obtain a solvent containing different ratio of the di-2-ethylhexylorthophosphoric acid and the ammonium di-2-ethylhexylorthophosphate salt.

While the appended claims and this specification contemplate "first" and "second" immiscible extractant solvent media, it is to be understood that this is for convenience in depicting and explaining the process. There is no intention so to label either the amine extractant or the alkyl phosphate extractant as defined above. Either can be employed in the first step of the process. Moreover, in carrying out any particular separation in accordance with this invention, it is not necessary to use one alkyl phosphate extractant solvent medium with one amine extractant solvent medium since two amine extractant solvent media or two alkyl phosphate extractant solvent media can be used provided only that the media selected show the necessary degree of selectivity for at least one of the metal values in solution relative to at least one other metal value in the solution. In the organic solvent bridge systems wherein aqueous media are employed as the first and second immiscible solvent, such relative selectively is achieved by varying the pH and ionic strength, and the like, between aqueous media. These concepts are familiar to those skilled in the art.

"Recovering" the metal values can be the valuable out in any art-recognized manner. For example, in the water bridge embodiments wherein the extracted metal values are dissolved in organic extractant media they can be recovered by precipitation, by evaporation, by re-extraction with an aqueous phase or by stripping the solvent with an appropriate aqueous stripping solution, e.g., an aqueous strong mineral acid, or an alkali metal carbonate, and the stripped solvent returned to the process. The separated metal values can be concentrated, for example, merely by evaporating the stripping solution or by proper chemical treatment. Solid residues can be calcined or subjected to further well-known treatments and purifications to yield the valuable commercial products mentioned hereinabove. In the organic solvent bridge embodiments wherein the extracted metal values are dissolved in aqueous extractant media, they can be recovered either through boiling off volatile acids, HCl and HF (in appropriate cases) and subsequent volume reduction through evaporation; or they can be precipitated by the addition of appropriate reagents, such as anhydrous ammonia or caustic soda. Also, ion exchange columns can be used for the intermediate treatment of the aqueous solutions containing the metal values by well known techniques in order to recover said values.

DESCRIPTION OF THE DRAWINGS

A more complete understanding of the present process and of the advantages obtained therewith will be understood from the following discussion with reference to the drawings in which.

Figure 1:
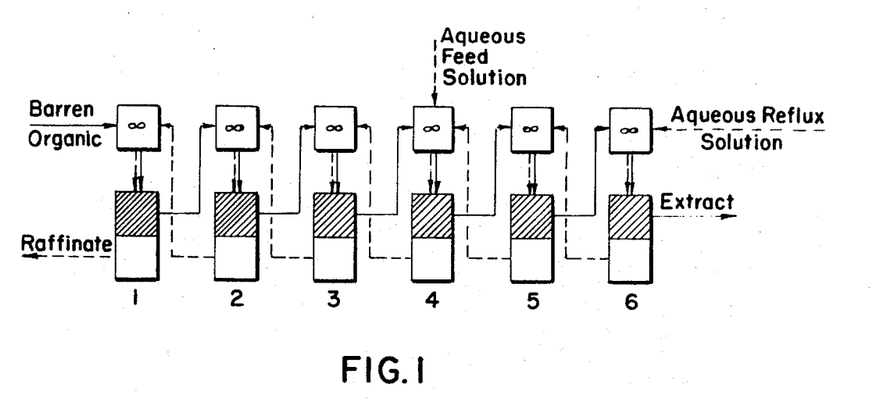
FIG. 1., is a flow diagram illustrating a conventional single solvent extraction process using the solvent countercurrently in four extraction and two reflux stages, to provide an extract of the metal values and an aqueous raffinate.

While the legends placed on the drawings make them virtually self-explanatory, with reference to FIG. 1, six stages are shown, each of which comprise one mixer (top) and one settler (bottom). The organic extractant flows in countercurrently to the aqueous feed. In the figure the arrangement shown comprises four stages of extraction, 1–4, and two stages of reflux, 5–6. In the reflux stage, the organic extractant conventionally is contacted with an aqueous reflux solution to improve the purity of the extract. Such a reflux step can be added to any of the systems described for the present invention without departing from the spirit or scope thereof. With this prior art system, the metal values to be separated are recovered from two products, a raffinate from stage 1 and an extract from stage 6.

Figure 2:
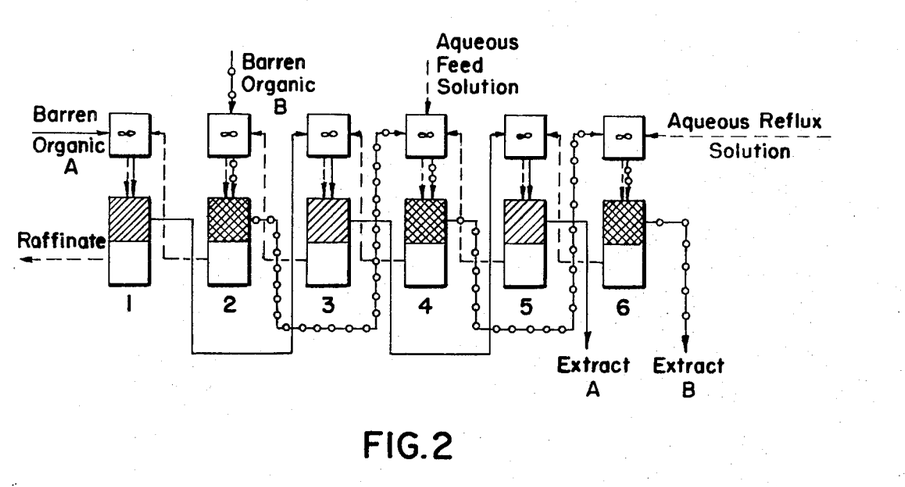
FIG. 2., is a flow diagram illustrating a double solvent extraction process using both organic solvents cocurrently to advance countercurrently in two extraction and one reflux stage, to provide two extracts and an aqueous raffinate. This is a preferred embodiment of the said copending U.S. Pat. application Ser. No. 657,580, filed Aug. 1, 1967.

FIG. 2 illustrates a double solvent extraction system, which gives substantially improved separation compared to the single solvent extraction process of FIG. 1. In this system, two solvents, A and B, flow in cocurrent to each other, but countercurrently to the aqueous solution of metal values. In the arrangement shown, each organic solvent extracts through two stages and is refluxed in one stage. Recovery of the metal values from this system are achieved by treating two extracts, A and B, from stage 5 and 6 respectively, and one raffinate from stage 1 may contain unextractable metal values. If the organic solvents are properly selected, a highly efficient separation of the values contained in the aqueous feed solution can be attained. Although the process illustrated in FIG. 2 is powerful, both organic solvents flow cocurrently against the aqueous solution and maximum efficiency is limited by this factor.

Figure 3:
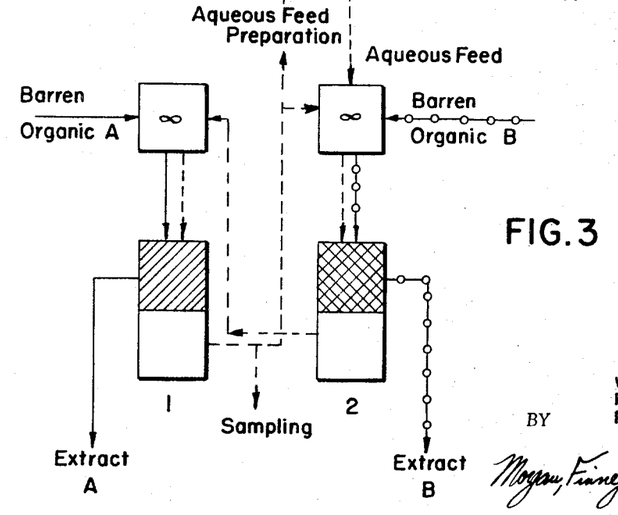
FIG. 3., is a flow diagram illustrating a single-stage aqueous solvent (water) bridge process using two organic solvents and a continuously circulating bridging solvent to provide two extracts, according to this invention.

In FIG. 3 there is shown a flow path according to the present invention which will provide improved recovery and purity of the extracted elements over the said double solvent extraction process. In the process of FIG. 3, one extractant solvent is fed into each end of the double solvent extraction stage and each is separately mixed with an aqueous solution continuously circulating between each mixer-settler. Aqueous feed may be introduced into the system at any point of the system shown by the broken lines (- - -), by taking some of the circulating water between the two stages and dissolving metal values, for example, oxides or carbonates, therein. Once enough acid, e.g., sulfuric, nitric, hydrochloric and the like, is added to obtain the desired pH, the aqueous is re-introduced into the bridge. In this manner, two solvent extracts are obtained. To analyze the efficiency of the separation, a sample can be taken from the bridge circuit, e.g., where indicated, and the distribution coefficients (K) and separation factors (S) can be determined, as will be described hereinafter.

Figure 4:
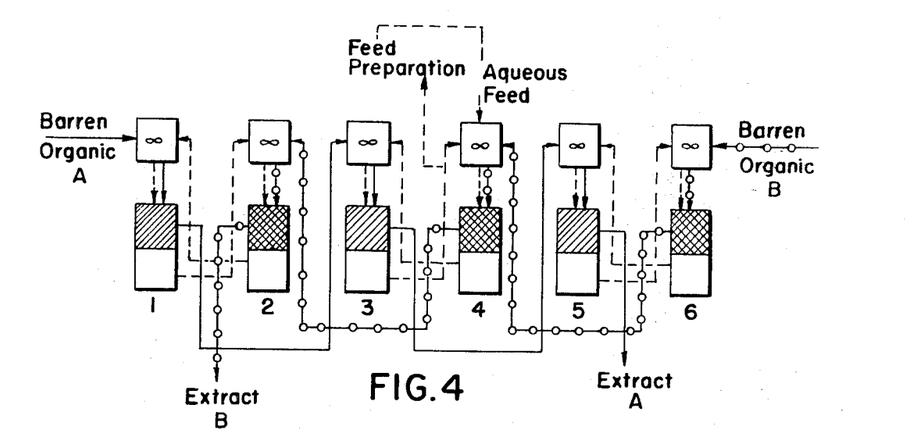
FIG. 4., is a flow diagram illustrating a three-stage double extraction water bridge process according to this invention using two organic extractants, each of which is subjected to a subsequent stage extraction using paired bridging aqueous solutions to provide two organic extracts.

FIG. 4 illustrates one preferred system of this invention, which contains three stages of water bridges and has two solvents flowing countercurrently against each other. This provides for the use of two organic extractants (each of which usually are mutually soluble) avoiding mixing of the two. The feed solution containing the metal values may be introduced into this system by a number of methods. As is shown in FIG. 4, for example, this feed is introduced into the middle water bridge and what would ordinarily be the raffinate in a single or double solvent extraction system (FIGS. 1 and 2) is used to prepare more of the feed. As is mentioned above, however, the values can also be introduced elsewhere. Each settler and mixer pair includes an aqueous bridging solution which, as will be shown hereinafter, may be adjusted in pH, ionic strength, etc., as may be desirable.

Figure 5:
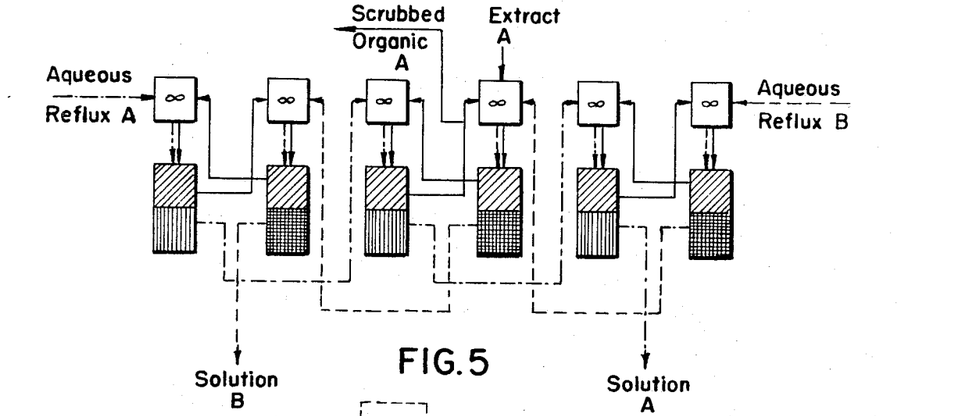
FIG. 5., is a flow diagram illustrating a three-stage double extraction solvent bridge process according to this invention using two aqueous extractants, each of which is subjected to a subsequent stage extraction using paired bridging organic solvents to provide two aqueous extracts. This system has been explained above.

FIG. 5 illustrates the solvent bridge solvent extraction system according to this invention. The feed solution usually will be an organic solvent (Extract A) containing the metal values desired to be separated. Analogously to the system shown in FIG. 4, aqueous reflux solutions A and B are introduced at opposite ends and flow countercurrently against one another. Corresponding to the raffinate in prior art systems, will be a scrubbed organic (A). As mentioned above, the metal values can also be fed in aqueous A or B. In each stage comprising a pair of mixer-settlers there is continuously circulating an organic bridging solvent (solid line) which prevents the aqueous refluxes from mixing, while permitting the exchange of metal values between them.

The efficiency of the present process can be measured and compared with the liquid-liquid extraction processes of the prior art by obtaining analytical data to calculate distribution coefficients (K) and separation factors (S). The distribution coefficient is defined as the ratio of concentration of the extractable species between two immiscible solvent phases — in the present case, between organic and aqueous solutions:

$$K = \frac{\text{concentration in organic phase}}{\text{concentration in aqueous phase}}$$

The separation factor between two elements is defined as the ratio of the distribution coefficient obtained from above. Thus the separation factor for two difficult to separate species, A and B, may be expressed as follows:

$$S = \frac{K_A}{K_B} = \frac{\text{distribution coefficient for A}}{\text{distribution coefficient for B}}$$

Those skilled in the art will understand that because two organic solvents are used in the double solvent process shown in FIG. 2 and in the double solvent, water bridge and solvent bridge, processes shown in FIGS. 3–5, it is somewhat difficult to compare the efficiency of these systems with straight conventional countercurrent single solvent extraction as shown in FIG. 1. However, it is reasonable to assume that since one solvent is working against the other, one of them is playing the part of the aqueous in the single solvent system. In other words, FIG. 1 shows one extractant and one raffinate being produced and one can assume that extract B in FIG. 3 is a raffinate, while extract A is comparable to the extract in the system of FIG. 1. Assuming this, it becomes possible to compare the efficiency of the two systems in terms of distribution coefficients and separation factors. AS will be seen from the examples, hereinafter, the present process provides separation factors very substantially greater than those of the conventional single solvent extraction process and substantially better also than those of the double stage process described in copending application Ser. No. 657,580, now abandoned, filed Aug. 1, 1967.

Because temperatures do not seem to be particularly critical to the practice of the present invention, they may be varied over the operating ranges usually employed in solvent extraction procedures. It has been found, however, that beneficial results are sometimes obtained if the stages are warmed up in order to improve phase separation in the settlers. Depending on the diluent used, temperatures of up to 45° C. can be employed. This moderate elevation in temperature has a favorable effect on the rate at which the mixed aqueous and organic disengage once transferred from the mixer to the settler. This is especially true in cases where amines, e.g., Primene JM–T, are used as one of the solvents.

DESCRIPTION OF THE PREFERRED EMBODIMENTS

To further illustrate the present invention with respect to the separation of extractable but difficulty separable metal values, especially rare earth values, from solutions thereof, the following specific examples are presented. An amine solvent which preferentially extracts the light rare earth values is used as one of the solvents and a phosphate solvent which preferentially extracts the heavy rare earth values is used as the other solvent. The examples are merely illustrative since, as has been mentioned hereinabove, the first and second extractant solvents can comprise amines or phosphates or mixtures of the two, or any other pair of solvents selected to perform the desired separation.

EXAMPLE 1

A pair of mixer-settlers were provided and arranged as shown in FIG. 3. This system is a single stage water bridge according to this invention. An aqueous solution was prepared, containing 75 g./l. of praseodymium-neodymium oxides in the nitrate form (33 percent Pr–67 percent Nd). One of the immiscible extractants comprised 50 percent by weight of diethylhexyl phosphoric acid (HDEHP) dissolved in kerosene. The other immiscible extractant comprised 25 percent by weight of a long chain alkyl quaternary amine, tricaprylyl methyl ammonium chloride Aliquat 336), dissolved in an aromatic hydrocarbon mixture (SacoSol 150). At phase ratio O/A of 2.0 for Aliquat and 1.0 for HDEHP, the system was allowed to reach equilibrium by circulating at a rate of 100 ml./min. for each aqueous and HDEHP and 200 ml./min. for Aliquat 336. Each organic phase was analyzed for praseodymium and neodymium. The distribution coefficient (K) for each metal value in each solvent was calculated as described hereinabove and the separation factor (S) for praseodymium and neodymium between HDEHP and Aliquat 336 was calculated, also as described hereinabove.

To compare the results of this process with a conventional single stage single solvent extraction system, an aqueous solution of praseodymium and neodymium nitrate of the same composition was extracted with a solution of HDEHP in kerosene under the same conditions. Another portion was extracted with Aliquat 336 in SacoSol 150 under the same conditions. The organic and aqueous phases were separated and analyzed and K and S for the two elements with respect to each of the two solvents were calculated.

The results of the three processes are summarized in table 1:

TABLE 1

Comparison of Separation of

Praseodymium and Neodymium in 1-Stage
Water Bridge System with Straight
Solvent Extraction

| Test No. | System | Type | Element | K | S (Nd/Pr) |
|---|---|---|---|---|---|
| 1 | HDEHP-Aqueous | single solvent | Pr | 0.42 | 1.19 |
|   |   |   | Nd | 0.50 |   |
| 2 | Aliquat 336 Aqueous | single solvent | Pr | 0.76 | 1.77 |
|   |   |   | Nd | 0.46 |   |
| 3 | HDEHP-Aliquat 336) | double Solvent Bridge | Pr | 1.01 | 2.23 |
|   |   |   | Nd | 2.25 |   |

It is evident that a greater separation factor was obtained with the water bridge according to this invention, test 3, than could be achieved with either of the conventional single solvent extraction systems, tests 1 and 2.

EXAMPLE 2

The single-stage water bridge procedure of example 1 was used to separate light from heavy rare earths and yttrium. The 47 employed were 15 percent diethylhexyl phosphoric acid (HDEHP) in kerosene and 15 percent of a primary amine having 18–21 carbon atoms (Primene-JM–T, Rohm & Haas Co.) in kerosene. In the aqueous bridge there was placed a rare earth and yttrium mixture at 27 g./l. concentration (as $RE_2O_3$) and as the sulfates at pH 4. After reaching equilibrium, the organic and aqueous phases were analyzed and the relevant K values were determined. Table 2 presents the analysis of the aqueous feed and the extracts obtained; also, the calculated K values as a ratio of concentration of a particular element in the HDEHP extract and its concentration in the JM–T extract.

TABLE 2
Separation of Rare Earths and Yttrium in a 1-Stage Water Bridge System

| Test No. | Rare earth and yttrium feed composition, percent | Metal values extracted HDEHP percent | JM–T percent | $K\left(\dfrac{HDEHP}{JMT}\right)$ |
|---|---|---|---|---|
| 4 | La, 1.8 |  | 4.2 |  |
|   | Ce, 2.6 |  | 5.8 |  |
|   | Pr, 2.1 |  | 4.7 |  |
|   | Nd, 11.7 | 0.9 | 25.4 | 0.043 |
|   | Sm, 33.3 | 17.5 | 53.3 | 0.42 |
|   | Eu, 1.0 | 1.1 | 0.7 | 2.0 |
|   | Gd, 18.0 | 28.0 | 5.5 | 6.5 |
|   | Tb, 3.5 | 5.9 | 0.3 | 23.8 |
|   | Dy, 9.1 | 16.3 |  |  |
|   | Ho, 1.9 | 3.4 |  |  |
|   | Er, 0.8 | 1.4 |  |  |
|   | Tm, 0.2 | 0.4 |  |  |
|   | Yb, 0.8 | 1.5 |  |  |
|   | Lu, 0.1 | 0.3 |  |  |
|   | Y, 13.0 | 23.3 |  |  |

From these data the ratios of K values, i.e., the separation factors S were calculated as described above. They were Sm/Nd, 9.7; Eu/Sm, 4.8; Gd/Eu, 3.3; and Tb/Gd, 3.7. In contrast, all amine and phosphate extractant solvents in the literature in single solvent extractions provided separation factors between consecutive rare earths on the order of 1.0 to 2.5 at best, averaging in general about 1.5. Thus the separation factors with the present process between the middle rare earths (which are the only ones possible to calculate because the others are not present in one or the other solvent) are substantially higher than those expected from reported data on the same solvents acting alone.

EXAMPLE 3

The use of a multistage extraction process according to this invention multiplies substantially the separation factors obtained with a single-stage water bridge. A three-stage system comprising three pairs of mixer-settlers was provided, arranged as shown in FIG. 4. This was used to separate light from heavy rare earths and yttrium. The solvents used were 50 percent HDEHP in an aromatic hydrocarbon solvent mixture (SacoSol 150), which entered in mixer 1 (water bridge No. 1) at a rate of 100 ml./hr., and 25 percent Aliquat 336 in SacoSol 150 entering in mixer 6 (water bridge No. 3) at a rate of 1,000 ml./hr. Aqueous feed comprised a rare earth and yttrium mixture at 100 g. rare earth oxide per liter concentration plus 4 molar $NH_4NO_3$, and this was introduced into mixer 4 (water bridge No. 2). Through water bridge No. 1 there was circulated aqueous 2 M $NH_4NO_3$ as the bridging solvent, pH 1.0; in water bridge No. 2, there was circulated the feed, 4M in $NH_4NO_3$, pH 1.0; and in water bridge No. 3 there was circulated aqueous 4M $NH_4NO_3$ and 1.5 normal $HNO_3$. After extraction, the rare earth feed composition and the extracts were analyzed and the relevant K values were determined. The analyses are summarized in table 3:

TABLE 3
Separation of Rare Earths and Yttrium in a 3-Stage-Water-Bridge System

| Test No. | Rare Earth & Yttrium Feed Composition, % |  | Metal Values Extracted HDEHP, % | Aliquat 336, % |
|---|---|---|---|---|
| 5 | La | 1.9 |  | 2.1 |
|   | Ce | 4.1 |  | 4.6 |
|   | Pr | 4.9 |  | 5.5 |
|   | Nd | 27.3 | 0.1 | 30.5 |
|   | Sm | 46.8 | 13.4 | 50.8 |
|   | Eu | 0.4 | 0.5 | 0.4 |
|   | Gd | 9.3 | 36.6 | 6.0 |
|   | Tb | 0.7 | 6.2 | 0.1 |
|   | Dy | 1.3 | 12.2 |  |
|   | Ho | 0.2 | 2.0 |  |
|   | Er | 0.3 | 2.7 |  |
|   | Tm | 0.05 | 0.5 |  |
|   | Yb | 0.1 | 1.1 |  |
|   | Lu | 0.04 | 0.3 |  |
|   | Y | 2.6 | 24.4 |  |

From these data, using the methods described above, separation factors S were calculated. They are Sm/Nd, 107; Gd/Sm, 23; and Tb/Gd, 8.1. These were substantially greater than those obtained in the single-stage water bridge system, which in turn was much more efficient than the single solvent system.

EXAMPLE 4

A single-stage water bridge process according to this invention was used to separate lanthanum from praseodymium and neodymium. The system is described in FIG. 3. One extractant comprised HDEHP partially neutralized with ammonia (43percent HDEHP plus 7percent $NH_4HDEHP$) in SacoSol 150 and the other comprised 15percent Aliquat 336 in SacoSol 150. The feed solution comprised aqueous La-Pr-Nd concentrate, 75 g./l. (as $RE_2O_3$) in the form of nitrate salts, which solution was 4 molar in $NH_4NO_3$. After extraction the extracts were analyzed for rare earth content and the results are summarized on table 4:

TABLE 4
Single Stage Water Bridge Separation of Lanthanum from Praseodymium and Neodymium

| Test No. | Rare Earth Feed Composition, % |  | Composition of Extracts HDEHP, % | Aliquat 336, % |
|---|---|---|---|---|
| 6 | La | 74.0 | 41.2 | 88.0 |
|   | Pr | 7.5 | 14.7 | 4.6 |
|   | Nd | 18.5 | 44.1 | 7.4 |

With this system it was possible to increase the lanthanum content from 74 percent in the feed to 88 percent in the Aliquat extract and to recover 81.7 percent. Recovery of Pr-Nd in the HDEHP extract was 81.7 percent.

EXAMPLE 5

A lanthanum-praseodymium-neodymium concentrate was separated in a five-stage water bridge system according to this invention. The arrangement is very similar to that depicted in FIG. 4, except that one extra stage was used at each end. The solvents used were 30percent HDEHP in kerosene entering Mixer 1 (water bridge No. 1) at at a rate of 300 ml./hr. and 15percent Primene JM-T (defined above) in kerosene entering Mixer 10 (Water bridge No. 5) at a rate of 300 ml. per hour. The aqueous feed was a rare earth sulfate solution (10 g./l. as $RE_2O_3$) which circulated through water bridge No. 3. (mixer pairs 5 and 6). The pH of the aqueous bridging solvents were respectively water bridge No. 1, 1.4; No. 2, 1.5; No. 3, 5.7; No. 4, 2.2; and No. 5, 2.0. After extraction the extracts were analyzed for rare earth content and the results are summarized in table 5.

TABLE 5.—FIVE-STAGE WATER BRIDGE SEPARATION OF LANTHANUM FROM PRASEODYMIUM AND NEODYMIUM

| Test No. | Rare earth feed composition, percent | | Metal values extracted | |
|---|---|---|---|---|
| | | | HDEHP, percent | Aliquat 336, percent |
| 7 | | G./l. $RE_2O_3$ | 3.3 | 5.5 |
| | La | 74.0 | 36.9 | 92.4 |
| | Pr | 7.5 | 13.8 | 2.2 |
| | Nd | 18.5 | 49.3 | 5.4 |

It was demonstrated that the purity of lanthanum can be increased up to 92.4 percent in the primary amine (JM-T extract with a recovery of 82.3 percent.

EXAMPLE 6

A 50 percent by volume solution of diethylhexyl phosphoric acid solution in SacoSol 150 was loaded with 16.45 g. of rare earth elements per liter. The composition of this loaded organic solution was as follows:

| | mg. RE/l. | RE purity, % |
|---|---|---|
| La | 353 | 2.1 |
| Ce | 159 | 1.0 |
| Pr | 1,112 | 6.8 |
| Nd | 4,782 | 29.1 |
| Sm | 7,224 | 43.9 |
| Eu | 88 | 0.5 |
| Gd | 1,829 | 11.1 |
| Tb | 94 | 0.6 |
| Dy | 147 | 0.9 |
| Ho | 47 | 0.3 |
| Er | 41 | 0.2 |
| Tm | Trace | |
| Yb | 29 | 0.2 |
| Lu | Trace | |
| Y | 547 | 3.3 |
| Total | 16,452 | |

At a phase ratio of 1.0, a one-stage solvent bridge extraction system was simulated. The loaded organic solution was equilibrated alternatively and continuously between two aqueous immiscible nitric acid solutions, at 0.5 and 1.0 N, respectively. Then the final aqueous and organic solutions were analyzed for rare earths by X-ray fluorescence techniques. The results are summarized in table 6:

Table 6

Single-Stage Solvent Bridge Separation of Rare Earths and Yttrium

| | Aqueous 0.5 N $HNO_3$ | | | Final Organic | | |
|---|---|---|---|---|---|---|
| | mg./l. | % Distr | % Purity | mg./l. | % Distr | % Purity |
| La | 141 | 40.0 | 5.1 | 6 | 1.7 | 0.1 |
| Ce | 47 | 29.6 | 1.7 | 12 | 7.4 | 0.3 |
| Pr | 441 | 39.7 | 15.8 | 41 | 3.7 | 1.0 |
| Nd | 1,317 | 27.6 | 47.2 | 317 | 6.6 | 8.0 |
| Sm | 718 | 9.9 | 25.7 | 1,729 | 23.9 | 43.7 |
| Eu | 29 | 33.3 | 1.1 | 12 | 13.3 | 0.3 |
| Gd | 82 | 4.5 | 3.0 | 988 | 54.0 | 25.0 |
| Tb | | | | 76 | 81.2 | 1.9 |
| Dy | 3 | 2.0 | 0.1 | 135 | 93.8 | 3.4 |
| Ho | | | | 47 | 100.0 | 1.2 |
| Er | 2 | 5.4 | 0.1 | 29 | 78.4 | 0.7 |
| Tm | | | | 4 | | 0.1 |
| Yb | 3 | 11.1 | 0.1 | 18 | 66.6 | 0.5 |
| Lu | | | | 2 | | 0.1 |
| Y | 4 | 0.7 | 0.1 | 547 | 98.2 | 13.7 |
| Total | 2,787 | | | 3,957 | | |

| | Aqueous 1.0 N $HNO_3$ | | |
|---|---|---|---|
| | mg./l. | Distr | % Purity |
| La | 206 | 58.3 | 2.1 |
| Ce | 100 | 63.0 | 1.0 |
| Pr | 629 | 56.6 | 6.5 |
| Nd | 3,147 | 65.8 | 32.4 |
| Sm | 4,776 | 66.2 | 49.2 |
| Eu | 47 | 53.3 | 0.5 |
| Gd | 759 | 41.5 | 7.8 |
| Tb | 18 | 18.8 | 0.2 |
| Dy | 6 | 4.2 | 0.1 |
| Ho | | | |
| Er | 6 | 16.2 | 0.1 |
| Tm | | | |
| Yb | 6 | 22.2 | 0.1 |
| Lu | | | |
| Y | 6 | 1.1 | 0.1 |
| Total | 9,706 | | |

It can be seen that with only one stage using the system according to this invention, it was possible to upgrade the yttrium in the solvent from 3.3 percent to 13.7 percent with 98.2 percent recovery. It is also seen that two valuable aqueous solutions were produced containing the "light" rare earths, one being richer in the pair Pr-Nd and the other richer in Sm-Gd.

It will be obvious to those skilled in the art that if sufficient stages are provided and the metal values are properly selected, one element, e.g., a rare earth, which it is desired to separate, may concentrate in the aqueous bridging solvent. In this case, the system readily may be modified continuously to withdraw that particular aqueous from the water bridge and replace the volume with more barren aqueous solution.

Furthermore, since the water bridge system permits two organics of different qualities to extract from each other the desired elements, an obvious extension of the basic invention will comprise the use of three organic extractants, each working against the other two. As has been mentioned, there are some organic solvents which preferentially extract the light rare earth elements and others which preferentially extract the heavy rare earths. However, there are some solvents, such as, for example, trioctyl phosphine oxide, which preferentially extract the middle rare earths. Means thus now are available to employ a system using three organic solvents to split, in a few stages, the rare earths into three different and valuable fractions.

The above invention is not to be limited by the above description or examples which are given merely as illustrative. The scope of the invention is to be interpreted by the appended claims.

We claim:

1. A process for separating metal values selected from the group consisting of rare earth and yttrium values dissolved in a solution containing at least two of said metal values which comprises:

a. contacting and mixing said solution with a first immiscible extractant solvent medium, which extractant solvent medium exhibits selectivity for at least one of said metal values to produce a first extract comprising the first selectively extractable metal values dissolved in said first immiscible extractant solvent medium and separating said solution depleted in said first metal values from said first extract;

b. continuously circulating the solution from step (a) in a bridge between the first immiscible extractant solvent medium and a second immiscible extractant solvent medium;

c. contacting and mixing the solution circulated in step (b) with the second immiscible extractant solvent medium, which extractant solvent medium exhibits selectivity for at least one of said metal values to produce a second extract comprising the second selectively extractable metal values dissolved in said second immiscible extractant solvent medium and separating said solution depleted in said first and second metal values from said second extract;

d. continuously circulating the solution from step (c) in a bridge between the second immiscible extractant solvent medium and the first immiscible extractant solvent medium, whereby the bridge circuit obtained by the combination of steps (b) and (d) provides equilibration of metal values between the first immiscible extractant solvent medium and the second immiscible extractant solvent medium; and e. recovering said metal values from said first and second extracts.

2. A process as defined in claim 1 wherein said solution contains at least two selectively extractable metal values and at least one third metal value which is not selectively extractable either by the first or by the second of said immiscible solvents, including the step of recovering the third metal values from the solution depleted in said first and second metal values.

3. A process as defined in claim 1 including additional stages, wherein, if the extractant in step (a) is designated A and the extractant used in step (c) is designated B, the steps comprise:

I. contacting and mixing extract A with a bridging solvent medium immiscible with both A and B extractant media to become in equilibrium with the metal values of the bridging solvent medium; separating the bridging solvent medium; contacting and mixing the bridging solvent medium with fresh extractant B to produce an extract of the metal values; continuously recycling the bridging solvent between extractants A and B; obtaining a final extract A; and using extract B in step (c) of the central stage; and II. contacting and mixing extract B with a bridging solvent medium immiscible with both A and B extractant media to become in equilibrium with the metal values of the bridging solvent medium; separating the bridging solvent medium; contacting and mixing the bridging solvent medium with fresh extractant A to produce an extract of the metal values; continuously recycling the bridging solvent between extractants A and B; obtaining a final extract B; and using extract A in step (a) of the central stage.

4. A multistage process as defined in claim 3 including a third stage extraction and separation of the metal values using extracts from the second stage as extractants.

5. A continuous countercurrent multistage process according to claim 1 using in each subsequent stage the respective extracts containing the metal values as the extractants, pairing them through a bridging solvent medium with extractants to produce subsequent extracts of the metal values; continuously recycling each bridging solvent between the extracts; and using the extractant solvent media in the preceeding respective stages.

6. A process as defined in claim 1 wherein said solution is an aqueous solution and wherein said first and second immiscible solvent media are organic solvent media.

7. A process as defined in claim 1 wherein said solution is an organic solvent solution and wherein said first and second immiscible solvent media are aqueous media.

8. A process according to claim 5 wherein said metal values are fed into the system dissolved in the extractant media used in the last stage of said process.

9. A process according to claim 8 wherein said metal values are not fed into the first stage of said process.

10. A process as defined in claim 1 wherein said solution is an aqueous solution containing praseodymium and neodymium, said first immiscible extractant solvent medium comprises an alkyl ester of phosphoric acid in kerosene; said second immiscible extractant solvent medium comprises an aliphatic quaternary amine in kerosene; the first selectively extractable metal value is neodymium and the second selectively extractable metal value is praseodymium.

11. A process as defined in claim 1 wherein said solution is an aqueous solution comprising lanthanide series rare earth values and yttrium values; said first immiscible extractant solvent comprises diethylhexyl phosphoric acid in kerosene; said second immiscible extractant solvent comprises a mixture of tertiary alkyl primary amine isomers having 18–20 carbon atoms, in kerosene, said first selectively extractable metal values are heavy rare earth metals and yttrium; and said second selectively extractable metal values are light rare earth metals.

12. A three-stage continuous countercurrent separation process as defined in claim 4, wherein said solution is an aqueous solution containing about 100 grams/liter of rare earth values which is 4 molar in ammonium nitrate, said metals comprising lanthanide series rare earth values and yttrium values; said first immiscible extractant solvent medium is 50 percent diethylhexyl phosphoric acid in an aromatic hydrocarbon solvent; said second immiscible extractant solvent medium is 25 percent quaternary aliphatic amines in an aromatic hydrocarbon solvent; said first selectively extractable metal values are heavy rare earth metals and yttrium; and said second selectively extractable metals are light rare earth metals.

13. A process as defined in claim 1 wherein said solution is an aqueous solution comprising lanthanum, praseodymium and neodymium which is 4 molar in ammonium nitrate; and first immiscible extractant solvent medium is 50 percent diethylhexyl phosphoric acid in an aromatic hydrocarbon solvent which has been treated with ammonia; said second immiscible extractant solvent medium is 15 percent quaternary aliphatic amines in an aromatic hydrocarbon solvent; said first extractable metal values are praseodymium and neodymium and said second extractable metal value is lanthanum.

14. A five-stage process as defined in claim 5 wherein said solution is an aqueous solution comprising lanthanum, praseodymium and neodymium; said first immiscible extractant solvent medium is 30 percent diethylhexyl phosphoric acid in kerosene; said second immiscible extractant solvent medium is 15 percent alkyl primary amines having 18–21 carbon atoms in kerosene; the bridging solvents in stages 1 to 5 respectively, are aqueous mineral acids having pH values of 1.4, 1.5, 5.7, 2.2 and 2.0; the first extractable metal values are praseodymium and neodymium and the second metal value is lanthanum.

* * * * *